United States Patent [19]

Papapetros

[11] Patent Number: 4,872,644
[45] Date of Patent: Oct. 10, 1989

[54] MOTOR VEHICLE SERVICING TOOL

[76] Inventor: Peter A. Papapetros, 41-49 Victoria Street, Alexandria New South Wales 2015, Australia

[21] Appl. No.: 110,746
[22] PCT Filed: Feb. 14, 1986
[86] PCT No.: PCT/AU86/00038
 § 371 Date: Aug. 18, 1987
 § 102(e) Date: Aug. 18, 1987
[87] PCT Pub. No.: WO87/03837
 PCT Pub. Date: Jul. 2, 1987

[30] Foreign Application Priority Data

Dec. 23, 1985 [AU] Australia .................................. 04001

[51] Int. Cl.$^4$ ............................................. B23P 19/04
[52] U.S. Cl. ...................................... 254/10.5; 29/227
[58] Field of Search ................................. 29/215–218, 29/225, 227; 254/10.5

[56] References Cited

U.S. PATENT DOCUMENTS

| 3,982,730 | 9/1976 | Otsuka | 254/10.5 |
| 4,237,594 | 12/1980 | Young | 29/227 |
| 4,395,020 | 7/1983 | Spainhour | 254/10.5 |

FOREIGN PATENT DOCUMENTS 3021084 12/1981 Fed. Rep. of Germany ..... 254/10.5

Primary Examiner—Judy Hartman
Attorney, Agent, or Firm—Anthony A. O'Brien

[57] ABSTRACT

A tool for compressing the coil spring of a motor vehicle suspension strut comprises a rack with opposed sets of cleats mounted thereon which are adapted to grip respective coils of the spring intermediate its ends. The sets of cleats are selectively movable towards or away from each other along the rack by rotating a crank handle. Within each set, the cleat spacing may be adjusted by moving the cleats along arms on which they are mounted.

6 Claims, 2 Drawing Sheets

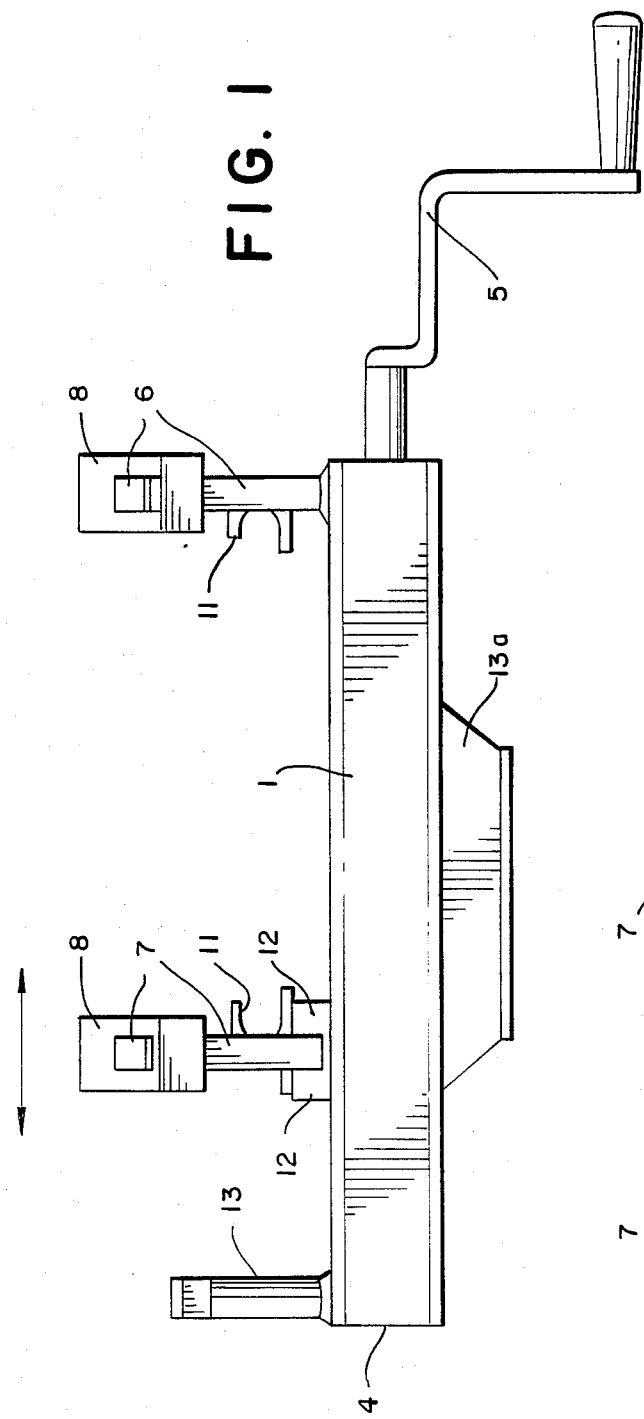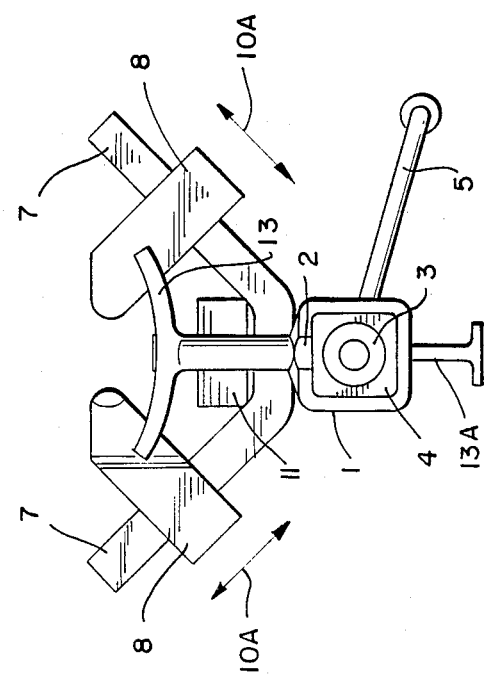

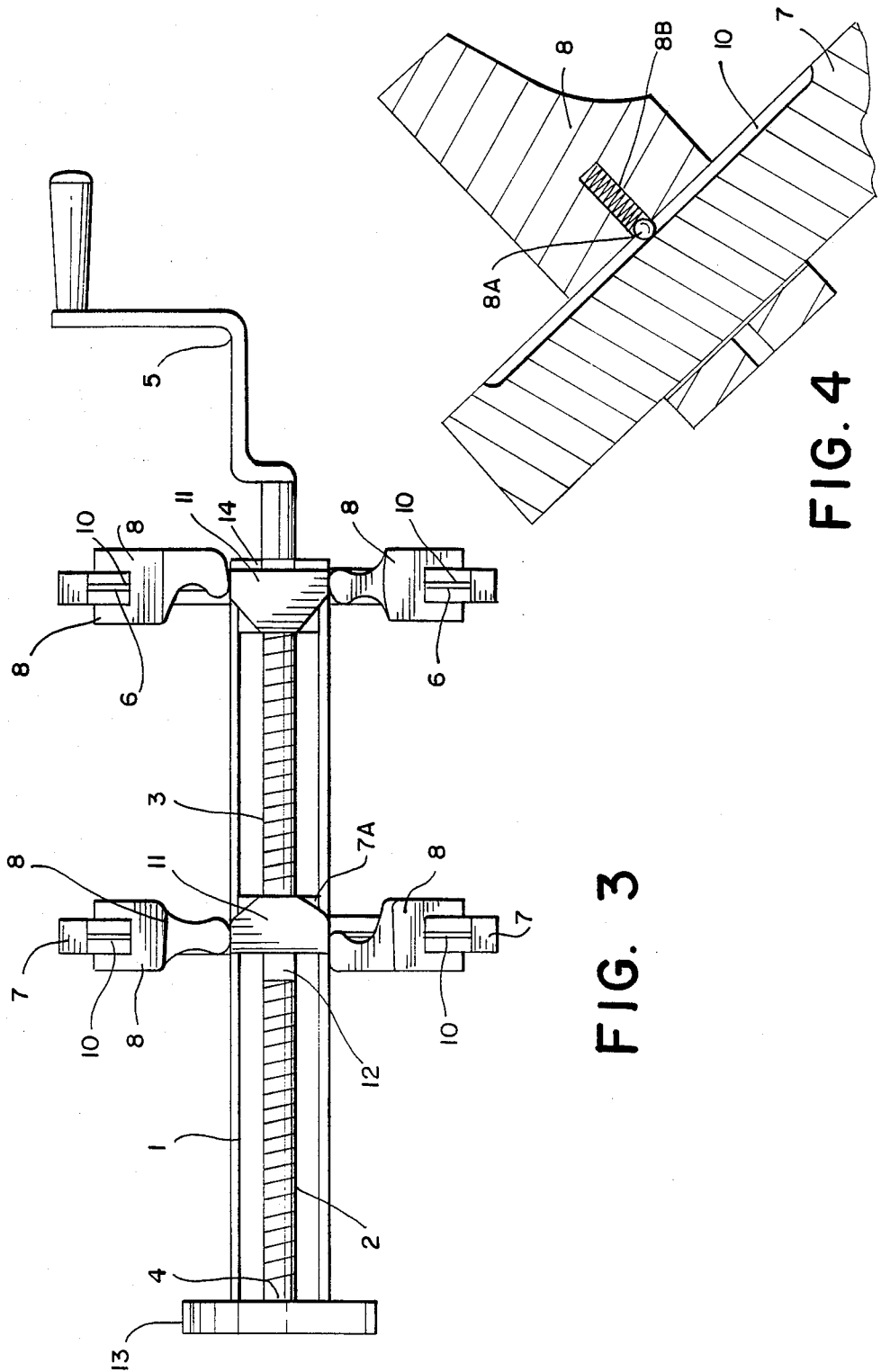

MOTOR VEHICLE SERVICING TOOL

This invention relates to motor vehicle servicing equipment and more particularly discloses an improved tool for the dismantling of suspension components.

The front end suspension of many late model motor vehicles use what are known in the trade as "MacPherson" strut assemblies. In such vehicles the major spring and shock absorber components for each wheel are incorporated into a single structure with the front axle. In order to service these units it is therefore necessary to first compress the coil suspension spring sufficiently to remove the loading on the other components of the strut so that it can be subsequently dismantled. The force required to do this however is naturally quite substantial and depending upon the size of the vehicle being serviced may be many hundreds of kilograms. Although there are a number of tools presently available for compressing these springs they tend to be awkward and time consuming to use and/or have a relatively short life due to the high stresses imposed on them.

One tool currently used in the trade comprises a yoke which is in two halves and is bolted around the lower portion of the strut assembly. Slots are provided on each side of the yoke to receive threaded bars which extend up on each side of the spring and through hooks adapted to grip each side of the coil so that as the threaded bars are turned down through the slots the yoke abuts against the cowling of the strut and the spring is compressed downwardly to free the end cap for subsequent removal. After the cap is unbolted the bars must however then be turned out of the yoke to decompress the spring and allow the hooks to be removed before the unit can be completely disassembled. After servicing the strut this procedure has to be repeated again to compress the spring before refitting the end cap. This procedure is thus extremely time consuming and moreover the apparatus is awkward to handle as it consists of a number of cumbersome components which must be manually assembled and positioned on the strut before each operation. In addition a serious safety hazard is often posed by such equipment as improper positioning of the various parts by inexperienced personal can result in the hooks slipping when under load so that the compressed spring releases suddenly and without warning.

It is therefore an object of this invention to correct the aforementioned disadvantages and accordingly this invention in one broad form discloses a tool for compressing the coil spring of a motor vehicle suspension system comprising a rack with opposed sets of cleat means mounted thereon which are adapted to grip respective coils of the said suspension spring intermediate the ends thereof and said sets of cleats being selectively movable towards or away from each other along said rack in a manner whereby the coils of said spring may be compressed or extended.

Preferred embodiments of this invention will now be described with reference to the attached drawings in which:

FIG. 1 is a side view of the inventive spring compressor;

FIG. 2 is a corresponding end view of the spring compressor;

FIG. 3 is a plan view of the spring compressor,

FIG. 4 is a partial cross-sectional view of a detail of the cleats and arm arrangement.

A spring compressor according to this invention may include a rack 1 fashioned from a section of hollow channel. This rack may be substantially square in cross-section with a groove or slot 2 formed in the upper wall and extending along its length. A threaded bar 3 is rotatably mounted within this rack with one end being supported in a bearing block 4 and the other terminating in a crank handle 5. There are also pairs of transverse upwardly curved arms 6 and 7 disposed on the top of the rack. One pair 6 is welded or otherwise rigidly secured to the end of the rack adjacent the crank handle 5. The other pair 7 is mounted on a block 7A which is adapted for a close sliding fit along the inside of the rack 1. This block is also provided with a threaded aperture which receives the threaded bar 3 referred to earlier so that rotation of the crank handle 5 serves to move the block and associated arms 7 back or forth along the length of the rack. Mounted on each of these arms 6 and 7 are cleats 8 which are shaped to insert between and grip the coils of a motor vehicle suspension spring cradled between the upturned arms. As shown in FIG. 4 a conventional detent ball is disposed in each of the cleat blocks 8. The ball 8A is biased by an internal spring 8B to engage in grooves 10 in the arms. In this manner the cleats are movable (see arrow 10A in FIG. 2) yet can be retained in any selected position along the arms in accordance with the spring suspension diameter. In order to retain the spring in position and prevent it from bowing outwardly a set of hooks 11 may also be fitted between each pair of arms to additionally grip the respective coils at this location. With the spring of a MacPherson strut assembly subsequent rotation of the crank 5 serves to progressively compress those coils located between the arms 6 and 7. This releases the loading on the end cap of the strut so that it can then be unbolted. The strut is then easily dismantled and removed from the spring which remains compressed between the arms throughout the entire operation. After servicing is completed the strut is again assembled through the spring which need only be released by reverse rotation of the crank after the end cap is finally refitted and bolted in place.

The upturned arms 6 and 7 preferably of one piece nonwelded construction and are fabricated from at least 20 mm square section steel bar. The slide block 7A is also preferably formed with shoulders 12 which extend up on each side of the arms 7 to assist in holding them against the force of the spring. Additional preferred features shown include a support or cradle 13 affixed to the end of the rack remote from the crank to carry the lower end of the strut assembly, an inverted "T" section 13A along the bottom of the rack to enable a more secure mounting on a bench vice or the like and an improved bearing mounting. In the latter case the bearing mounting is recessed to receive a ball bearing race 14 so that the applied load from the compressed spring is carried with a minimum of friction as the crank 5 is rotated. It is also proposed that the crank handle itself be of an "L" shape so as to be more easily manipulated by an operator.

It will thus be appreciated that this invention at least in the form of the embodiment disclosed provides a novel and unique tool for servicing motor vehicle suspension systems. Indeed it has been found that experienced personal with the aid of this device require as little as five minutes to dismantle a strut assembly which with conventional apparatus would normally take up to half an hour. Clearly however the particular examples disclosed are only the currently preferred forms of this invention and a wide variety of modifications could be made which would be apparent to a man skilled in the art. For example the invention is not limited to any particular size or configuration for the arms or cleats as these may be varied in accordance with the type of spring or strut assembly on which the tool is to be used. Also while a crank or screw thread is currently proposed for exerting the required compressive force on the spring other equivalent hydraulic or even pneumatic systems may be employed.

The claims defining the invention are as follows:

1. A tool for compressing a motor vehicle suspension strut coil spring, comprising a rack, two pairs of upwardly curved arms, one pair being rigidly secured to one end of the rack, and the other pair being adapted to slide along the rack, two pairs of cleats, each cleat being mounted on a respective one of said arms, and adapted to engage said coil spring intermediate its ends, whereby said coil spring may be compressed, each of said cleats being movable relative to and along its respective arm so as to adjust for different diameters of coil spring, a cradle affixed to one of said rack to assist in supporting part of said motor vehicle suspension strut as the coil spring is compresed.

2. The tool as claimed in claim 1 wherein said rack includes a threaded bar rotatable in one direction to move said cleats towards each other and in the opposite direction to move said cleats away from each other.

3. The tool as claimed in claim 2, wherein said other pair of arms are mounted on a block having a close tolerance sliding fit within the rack, said block having a threaded aperture receiving said threaded bar.

4. The tool as claimed in claim 3, further comprising a pair of hooks, one between each pair of said arms, to grip the coils of the coil spring to prevent said spring from bowing outwardly as it is compressed.

5. The tool as claimed in claim 3, wherein said block comprises a pair of shoulders extending upward on either side of said other pair of arms to assist in holding them against reaction force of the coil spring.

6. The tool as claimed in claim 5, wherein each of said pairs of arms are of one piece non-welded construction.

* * * * *